(12) United States Patent
Mu et al.

(10) Patent No.: US 8,195,154 B2
(45) Date of Patent: Jun. 5, 2012

(54) METHOD FOR IMPLEMENTING TERMINAL ROAMING AND MANAGING IN THE SOFT SWITCH-BASED NEXT GENERATION NETWORK

(75) Inventors: Lingjiang Mu, Shenzhen (CN); Jun Ge, Shenzhen (CN); Jiashun Tu, Shenzhen (CN)

(73) Assignee: ZTE Corporation, Shenzhen, Guangdong Province P.R. (CN)

( * ) Notice: Subject to any disclaimer, the term of this patent is extended or adjusted under 35 U.S.C. 154(b) by 731 days.

(21) Appl. No.: 11/791,632

(22) PCT Filed: Nov. 30, 2004

(86) PCT No.: PCT/CN2004/001376
§ 371 (c)(1),
(2), (4) Date: May 25, 2007

(87) PCT Pub. No.: WO2006/058454
PCT Pub. Date: Jun. 8, 2006

(65) Prior Publication Data
US 2008/0045208 A1 Feb. 21, 2008

(51) Int. Cl.
*H04W 4/00* (2009.01)
(52) U.S. Cl. .......... 455/433; 455/432.1; 455/440; 455/436
(58) Field of Classification Search .......... 455/406–408, 455/432.1–433, 436–444; 370/331–334, 370/338
See application file for complete search history.

(56) References Cited

U.S. PATENT DOCUMENTS
5,148,472 A * 9/1992 Freese et al. .................. 455/408
(Continued)

FOREIGN PATENT DOCUMENTS
CN 1509085 A 6/2004
(Continued)

OTHER PUBLICATIONS
Request for Comments 2131, "Dynamic Host Configuration Protocol", R. Droms, Mar. 1997.*
(Continued)

*Primary Examiner* — Kent Chang
*Assistant Examiner* — Ronald Eisner

(57) ABSTRACT

It is a method for implementing terminal roam and management in the soft switch-based Next Generation Network, comprises: a user terminal moving on the IP network, when the IP address changing, the user terminal registering at a soft switch controlling device again, the user terminal attaining the allocated IP address of the said soft switch controlling device and registering at the exchange controlling device, after the soft switch controlling device receiving the register request of the user terminal, it attaining the user data of the said terminal from a database. The soft switch controlling device judges whether the user terminal roaming, if it roaming, the soft switch controlling device further judges whether allowing the user terminal to access, if the user terminal roaming and being allowed to access, then the soft switch controlling device transmits the transmission success response to the user terminal, the user terminal accesses to the soft switch controlling device. This method can provide the function of terminal roaming in the NGN, implementing the roaming management for the terminal, including the roaming right management function, roaming identification function and roaming charge function.

12 Claims, 2 Drawing Sheets

U.S. PATENT DOCUMENTS

| | | | |
|---|---|---|---|
| 5,706,330 A * | 1/1998 | Bufferd et al. | 455/405 |
| 6,075,783 A * | 6/2000 | Voit | 370/352 |
| 6,119,001 A * | 9/2000 | Delis et al. | 455/433 |
| 6,519,242 B1 * | 2/2003 | Emery et al. | 370/338 |
| 6,584,310 B1 * | 6/2003 | Berenzweig | 455/432.1 |
| 6,687,252 B1 * | 2/2004 | Bertrand et al. | 370/401 |
| 7,039,709 B1 * | 5/2006 | Beadle et al. | 709/227 |
| 7,079,499 B1 * | 7/2006 | Akhtar et al. | 370/310 |
| 7,161,897 B1 * | 1/2007 | Davies et al. | 370/217 |
| 7,184,418 B1 * | 2/2007 | Baba et al. | 370/331 |
| 7,260,638 B2 * | 8/2007 | Crosbie | 709/229 |
| 7,698,244 B2 * | 4/2010 | Aaron | 706/47 |
| 2001/0024950 A1 * | 9/2001 | Hakala et al. | 455/406 |
| 2001/0049790 A1 * | 12/2001 | Faccin et al. | 713/185 |
| 2003/0115298 A1 * | 6/2003 | Baker | 709/220 |
| 2003/0210694 A1 * | 11/2003 | Jayaraman et al. | 370/392 |
| 2004/0034793 A1 * | 2/2004 | Yuan | 713/200 |
| 2004/0176128 A1 | 9/2004 | Grabelsky | |
| 2005/0025182 A1 * | 2/2005 | Nazari | 370/469 |
| 2005/0041808 A1 * | 2/2005 | He | 380/248 |
| 2005/0143087 A1 * | 6/2005 | Touati et al. | 455/453 |
| 2006/0028996 A1 * | 2/2006 | Huegen et al. | 370/252 |
| 2007/0127471 A1 * | 6/2007 | Cantenot | 370/390 |
| 2007/0189276 A1 * | 8/2007 | Bennett | 370/356 |
| 2007/0220596 A1 * | 9/2007 | Keeler et al. | 726/7 |
| 2008/0045208 A1 * | 2/2008 | Mu et al. | 455/432.1 |

FOREIGN PATENT DOCUMENTS

| | | |
|---|---|---|
| CN | 1536819 A | 10/2004 |
| KR | 1020040027166 A | 4/2004 |

OTHER PUBLICATIONS

Request for Comments 2543, "SIP: Session Initiation Protocol", Rosemberg et al, Jun. 2002.*

Jong-Moon Chung, Wireless Multiprotocol Label Switching, IEEE 2001.*

International Search Report, PCT/CN2004/001376, dated Aug. 18, 2005.

* cited by examiner

METHOD FOR IMPLEMENTING TERMINAL ROAMING AND MANAGING IN THE SOFT SWITCH-BASED NEXT GENERATION NETWORK

CROSS REFERENCE TO RELATED APPLICATIONS OR PRIORITY CLAIM

This application is a national phase of International Application No. PCT/CN2004/001376 entitled "A Method For Implementing Terminal Roaming And Managing In The Soft Switch-Based Next Generation Network", which was filed on Nov. 30, 2004.

FIELD OF THE INVENTION

The present invention relates to a method for implementing terminal roam and management in the soft switch-based NGN (Next Generation Network).

BACKGROUND ART

The emergence of the NGN switch system separates the service from the control, and separates the transport layer and the control layer, and accessible terminals are becoming more and more diversified, a great many of soft terminals, portable intelligent NGN terminals start to be used in the soft switch network. The requirement for mobility of the terminals in the soft switch network generates naturally with the development of the miniaturization and portability of the terminals, as the core and key technology of the NGN, the soft switch system is constructed on the open packet network (mainly used in IP network), and the openness and planarity of the packet network provide convenience for the realization of the mobility of the terminals.

The terminal here, being a broad terminal concept, refers to all the terminals and access devices supported by the soft switch architecture, comprising: SIP (Session Initiation Protocol) terminal (terminal supporting the SIP protocol), H323 (protocol suite numbered as H.323 and defined by ITUT) terminal (terminal supporting H.323 protocol), MGCP (Media Gateway Control Protocol) terminal (terminal supporting MGCP protocol), H248 (protocol suite numbered as H248 and defined by ITUT) terminal (terminal supporting H248 protocol), NCS (Network-based Call Signalling) terminal (terminal supporting NCS protocol), and access devices such as IAD (Integrated Access Device).

Traditional roam technology is based on circuit and mobile network. With the development of the NGN, it is required that the terminal in the NGN network can also roam as the mobile terminal does. However, the manner for realizing the roam is required to be based on technology of IP network, which is different from the roam technology of the current mobile network. Currently, no solution is available for solving the problem.

SUMMARY

One technical problem the present invention aims to solve is to provide a method for implementing terminal roam and roam management according to the structure model of the NGN under the soft switch architecture.

In order to realize the above object, the present invention provides a method for implementing terminal roam and roam control under the soft switch architecture, and the method is used for implementing the roam and roam control of the NGN terminal, wherein the method comprise the following steps:

step 1, a user terminal moving in the IP network, and when its IP address changing, the user terminal registering at a soft switch controlling device again;

step 2, the user terminal attaining the IP address of the soft switch controlling device, and then sending a register request to the soft switch controlling device;

step 3, after receiving the register request of the user terminal, the soft switch controlling device attaining user data of the terminal from a database;

step 4, the soft switch controlling device judging whether the user terminal is roaming, and if it is roaming, the soft switch controlling device further judging whether to allow the user terminal to access; and step 5, if the user terminal is roaming and being allowed to access, the soft switch controlling device sending a register success response to the user terminal, and the user terminal accessing to the soft switch controlling device successfully.

The method as mentioned above, wherein in step 2, the step of attaining the allocated IP address of the soft switch controlling device is realized in a terminal accessing allocator.

The method as mentioned above, wherein the terminal accessing allocator allocates to the user terminal an IP address of the soft switch controlling device that the user terminal can access at its proximity; or the terminal accessing allocator allocates to the user terminal an alternate IP address of the soft switch controlling device.

The method as mentioned above, wherein the user terminal sends a register request to a default soft switch controlling device according to the attained IP address of the soft switch controlling device or directly.

The method as mentioned above, wherein the user data include user attribute, home registration information and roam right.

The method as mentioned above, wherein the soft switch controlling device judges whether the user terminal roams according to the IP address and the home registration information of the user terminal.

The method as mentioned above, wherein the soft switch controlling device judges whether to allow the user terminal to access according to the roam right of the user terminal.

The method as mentioned above, wherein after the user terminal roams and registers successfully, roam identifications are set on the charge list for all calls.

The method as mentioned above, wherein the database can be a single database server, or a database server group.

The method as mentioned above, wherein the database can be an independent database server or can be provided in the soft switch controlling device.

The method as mentioned above, wherein when the user terminal and the soft switch controlling device are not in a same network, a traversing device for different form networks is further provided to implement the mutual communication of the control signalling between the soft switch controlling device and the user terminal.

The method as mentioned above, wherein the NGN terminal comprises: a terminal supporting the SIP, a terminal supporting H.323 protocol, a terminal supporting MGCP protocol, a terminal supporting H248 protocol, a terminal supporting NCS protocol, or/and integrated access devices (IAD).

According to the structure model of the NGN, the present invention implements the roam function of the NGN terminal in the soft switch system, thereby providing the terminal roam function in the NGN network; and implements the roam management for the terminal, including such as a roam right management function, a roam identification function and a roam charge function for the user.

BRIEF DESCRIPTION OF THE ACCOMPANYING DRAWINGS

DETAILED DESCRIPTION OF THE EMBODIMENTS

Figure 1:
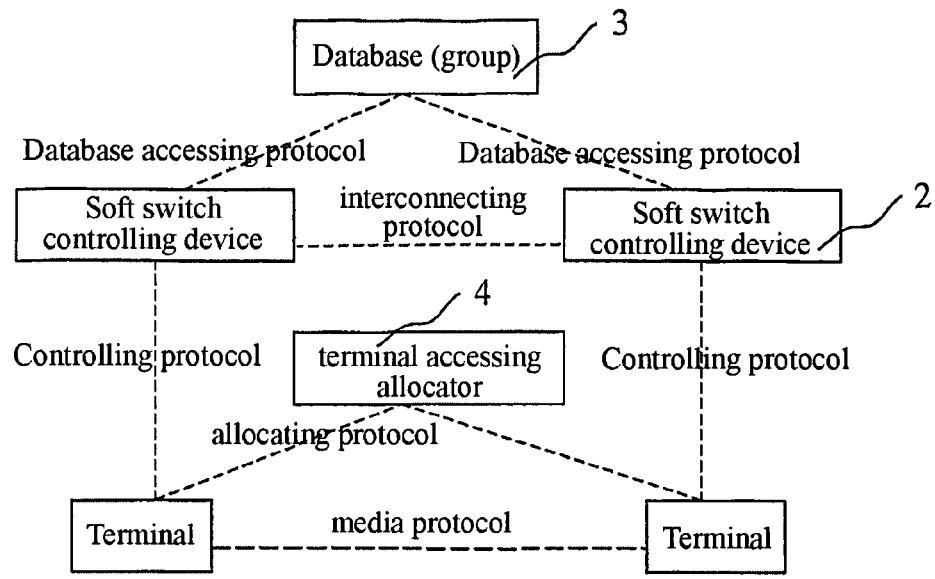
FIG. 1 is a schematic view illustrating the implementation of terminal roam in NGN network.

The present invention provides a method for implementing terminal roam and roam management in the soft switch architecture. In the implementation of the method, comprising the following devices: a database (database group), a soft switch controlling device, a terminal accessing allocator and various NGN terminals, as shown in FIG. 1. The present invention mainly comprises the following steps.

Step 1, the user terminal moves in the IP network, and its IP address changes, the terminal needs to register at the controlling device again.

Step 2, the terminal is accessed to the soft switch controlling device in an access manner of a specific strategy, and the specific strategy is realized in the terminal accessing allocator, and the specific strategy can be determined according to the actual situations. For example, if in view of the utilization ratio of the network resources, the terminal needs to access to the network at its proximity, which is conducted through that the terminal accessing allocator allocates an IP address of the soft switch controlling device to which the terminal can access at its proximity, and the terminal sends a register request to the soft switch controlling device; if in view of sharing the load of capacity, the manner of poll is employed, and the terminal accessing allocator allocates alternately to the terminal the IP address of the soft switch controlling device.

Step 3, after receiving the register request of the terminal, the soft switch controlling device attains the user data of the terminal from a database (the database can be a database group when the data require a large capacity), comprising the information such as user attribute, home registration information and roam right.

Step 4, the soft switch controlling device judges whether the terminal roams according to the IP address and the home registration information of the terminal. If the terminal roams, the soft switch controlling device judges whether to allow the terminal to access according to the roam right of the terminal.

Step 5, if the terminal roams and has the roam right, the soft switch controlling device sends a register success response to the terminal, and the terminal accesses to the controlling device successfully.

Further, when the terminal roams and registers successfully, all the calls have clear roam identifications in the charge list.

Further, in step 2, if the terminal accessing allocator is not employed, the terminal will directly sends a register request to the default soft switch controlling device (configured in the terminal).

Implementing the roam function requires the terminal to move first. The moving of the terminal in the IP network will certainly render the change of the IP address of the terminal. IP network is a plane network, and in theory, as long as the terminal accesses at any point, routing the whole network can be implemented. In view of the utilization ratio of the network resources, the terminal needs to access to the soft switch controlling device at its proximity, that is, the terminal needs to access to the closest soft switch controlling device, and hence, a terminal accessing allocator is needed to allocate an IP address of the accessed soft switch controlling device for the roaming terminal. In the presence of a private network, the terminal accessing allocator allocates an IP address of the traversing device for different form networks to the roaming terminal.

In addition, the function of managing the roaming terminal also needs to be realized. As a core controlling device, the soft switch controlling device mainly implements functions of access authentification and call control, and the database server stores data of the user such as user data, service data and roam right data.

Figure 2:
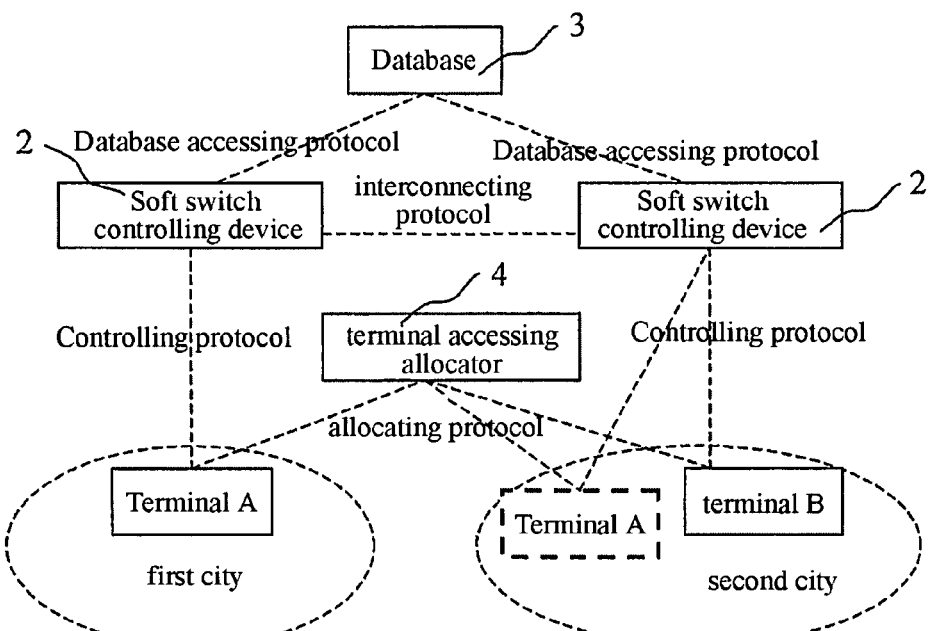
FIG. 2 is a schematic view illustrating the method for implementing terminal roam in NGN network in the case of no private network.

Therefore, FIG. 2 shows the circumstance that the terminal roams from one place to another when the soft switch controlling device, the database server, the terminal and the terminal access server are in a network planned by a same IP address.

Figure 3:
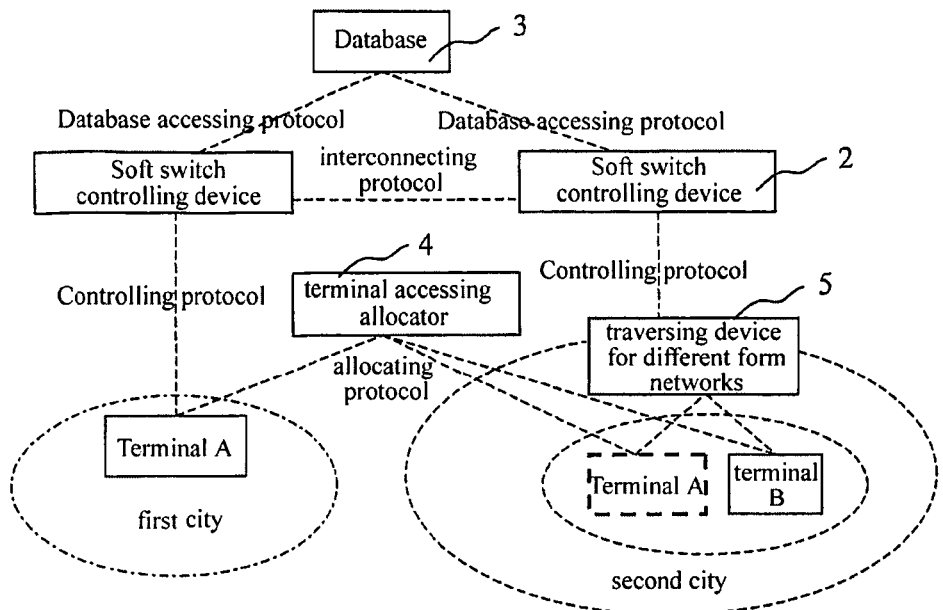
FIG. 3 is a schematic view illustrating the method for implementing terminal roam in NGN network in the presence of private network.

In actual IP network, many users are in a private network (local area network) established by themselves, and they communicate with the public networks mutually through a NAT device or a firewall device, and an traversing device for different form networks needs to be added to solve the roaming of such terminals, as shown in FIG. 3.

Figure 4:
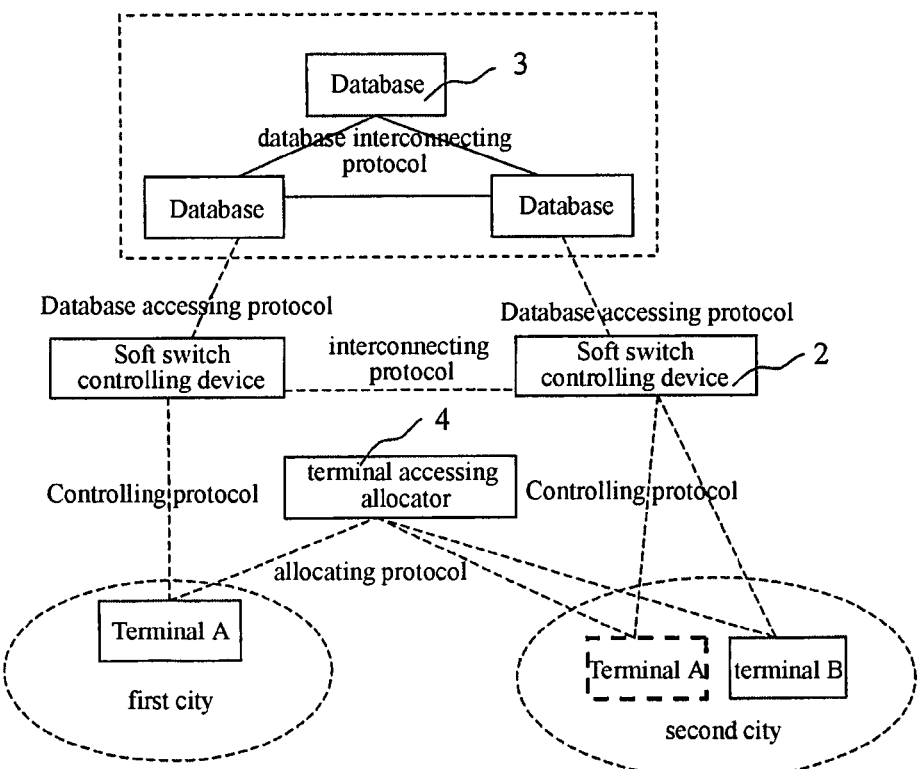
FIG. 4 is a schematic view illustrating the method for implementing terminal roam in NGN network in the presence of database group.

In case the number of the users is too large, only one database server cannot support them, and a database server group is needed to store the data of all the users, which is shown in FIG. 4. Of course, when the number of the users is not too large, the functions of the database server can also be realized directly in the soft switch device.

In order to explain the method for implementing the terminal roam more visually, a control flow of a typical "terminal roaming and registering" is given. First, suppose the following basic conditions:

terminal A is a terminal or an access device supported by the soft switch controlling device;

the user data of the terminal A is stored in the database server;

the user of the terminal A has a roam right;

the terminal allocator employs the strategy of proximity allocation; and the terminal A roams from a first city to a second city 2.

FIG. 2 illustrates an embodiment of the present invention that the terminal A roams to the public network of the second city.

(1). Terminal A powers on, sends a request to a terminal accessing allocator 4, and requests an IP address of an accessible soft switch controlling device 2;

(2). according to the current IP address of the terminal A, the terminal accessing allocator 4 allocates to the terminal A an IP address of the soft switch controlling device 2 which is at the proximity of the terminal A;

(3). the terminal A sends a register request to the soft switch controlling device 2 according to the attained IP address;

(4). the soft switch controlling device 2 attains the user data of the terminal A from a database 3 to learn that the home of the terminal A is the first city, and determines that the terminal A is in a roaming state;

(5). the soft switch controlling device 2 learns that the terminal A has the roam right according to the user data of the terminal A, then allows the terminal A to access, and sends an access success response to the terminal A; and (6). the terminal A can make calls after registering successfully, and the soft switch controlling device 2 will provide roam identifications in the charge list for the calls for the convenience of charge.

FIG. 3 illustrates another embodiment of the present invention that the terminal A roams to a private network of the second city.

In case the terminal A is in a private network and the soft switch controlling device 2 is in the public network, that is, they are not in the same network, an traversing device for different form networks 5 needs to be added to realize the mutual communication of the control signalling between the soft switch controlling device 2 and the terminal A. For the terminal A, the traversing device for different form networks 5 is transparent and invisible, and the terminal A considers the IP address of the traversing device for different form networks 5 as the IP address of the soft switch controlling device 2.

(1). Terminal A powers on, sends a request to a terminal accessing allocator 4, and requests an IP address of an accessible soft switch controlling device 2;

(2). according to the current IP address of the terminal A, the terminal accessing allocator 4 determines that the terminal is in a private network, and allocates to the terminal A an IP address of the traversing device for different form networks 5 which is at the proximity of the terminal A and connects the soft switch controlling device 2;

(3). according to the attained IP address, the terminal A sends a register request to the soft switch controlling device 2 through the traversing device for different form networks 5;

(4). the soft switch controlling device 2 attains the user data of the terminal A from the database 3 to learn that the home of the terminal A is the first city, and determines that the terminal A is in a roaming state;

(5). the soft switch controlling device 2 learns that the terminal A has the roaming right according to the user data of the terminal A, then allows the terminal A to access, and sends an access success response to the terminal A through the traversing device for different form networks 5.

(6). the terminal A can make calls after registering successfully, and the soft switch controlling device 2 will provide roam identifications in the charge list for the calls for the convenience of charge.

The above processing flow also applies to the circumstance that the terminal is in the public network and the soft switch controlling device is in a private network. Hence, such a method can be applied to other circumstances that the terminal and the soft switch controlling device are in different networks.

FIG. 4 illustrates another embodiment of the present invention that the terminal A roams to the public network of the second city and a database group is employed to store the user data when the amount of the user data is too large.

(1). Terminal A powers on, sends a request to the terminal accessing allocator 4, and requests an IP address of the accessible soft switch controlling device 2;

(2). according to the current IP address of the terminal A, the terminal accessing allocator 4 allocates to the terminal A an IP address of the soft switch controlling device 2 which is at the proximity of the terminal A;

(3). the terminal A sends a register request to the soft switch controlling device 2 according to the attained IP address;

(4). the soft switch controlling device 2 requests the user data of the terminal A from the database 2, the database 2 searches itself and finds no data of the terminal A, and then the database 2 attains the user data of the terminal A from another database 3 (database group) in the database group by the database interconnecting protocol, and responds the data to the soft switch controlling device 2;

(5). the soft switch controlling device 2 attains the user data of the terminal A to learns that the home of the terminal A is the first city, and determines that the terminal A is in a roaming state;

(6). the soft switch controlling device 2 learns that the terminal A has the roam right according to the user data of the terminal A, then allows the terminal A to access, and sends an access success response to the terminal A; and (7). the terminal A can make calls after registering successfully, and the soft switch controlling device 2 will provides roam identifications in the charge list for the calls for the convenience of charge.

Whereas the operating principle of the present invention has been particularly described, and the specific methods of implementing the roaming of the terminal within the different application range have been described, it will not be understood as limitations to the scope of the claims of the present invention.

Industrial Applicability

According to the structure model of the NGN, the present invention implements the roam function of the terminal in the soft switch system, thereby providing the terminal roam function in the NGN network; and implements the roam management for the terminal, including a roam right management function, a roam identification function and a roam charge function for the user.

After providing the functions of terminal roam and roam management, the soft switch system can prevent the profits of the service provider from losing due to the random roam of the terminal in the NGN network, thereby realizing the commercialization of the roam function of the whole soft switch system. And meanwhile, as a service, roam can improve turnover and quality of the service for the service provider.

What is claimed is:

1. A method for implementing terminal roam and roam management under a soft switch architecture, for implementing the roam and roam management of a Next Generation Network (NGN) terminal, comprising the steps of:

step 1, a user terminal moving in an Internet Protocol (IP) network, and when an IP address of the user terminal changes, the user terminal registering at a soft switch controlling device;

step 2, the user terminal attaining the IP address of the soft switch controlling device, and then sending a register request to the soft switch controlling device;

step 3, after receiving the register request of the user terminal, the soft switch controlling device attaining user data of the user terminal from a database, wherein the database is a database server group, the step of attaining user data of the user terminal from a database comprising one database server in the database server group searching for the user data, and if the database server finds no user data of the user terminal, the database server attaining the user data of the user terminal from another database server in the database server group by the database interconnecting protocol;

step 4, the soft switch controlling device judging whether the user terminal is roaming, and if it is roaming, the soft switch controlling device further determining whether to allow the user terminal to access; and step 5, if the user terminal is roaming and being allowed to access, the soft switch controlling device sending a register success response to the user terminal, and the user terminal accessing the soft switch controlling device successfully.

2. The method of claim 1, further comprising the user terminal sending a register request to a default soft switch controlling device according to the attained IP address of the soft switch controlling device or directly.

3. The method of claim 1 wherein the user data comprises one or more of user attribute information, home registration information and roam rights information.

4. The method of claim 3, further comprising the soft switch controlling device determining whether the user terminal roams according to the IP address and the home registration information of the user terminal.

5. The method of claim 3, further comprising the soft switch controlling device determining whether to allow the user terminal to access according to the roam rights of the user terminal.

6. The method of claim 1 wherein after the user terminal roams and registers successfully, roam identifications are set on a charge list for all calls.

7. The method of claim 1, wherein the database is provided in the soft switch controlling device.

8. The method of claim 1 wherein when the user terminal and the soft switch controlling device are not in a same network, and a traversing device for different form networks is further provided to implement the mutual communication of the control signaling between the soft switch controlling device and the user terminal.

9. The method of claim 1 wherein the NGN terminal comprises one or more of:
   a terminal supporting SIP, a terminal supporting a H323 protocol;
   a terminal supporting Media Gateway Control Protocol (MGCP) protocol;
   a terminal supporting a H248 protocol defined by International Telecommunications Union, Telecommunication Standardization Sector (ITU-T), a terminal supporting a Network-based Call Signalling (NCS) protocol; and an Integrated Access Device (IAD).

10. The method of claim 1 wherein in step 2, the step of attaining the IP address of the soft switch controlling device is realized in a terminal accessing allocator.

11. The method according to claim 10, wherein the terminal accessing allocator allocates to the user terminal an IP address of a soft switch controlling device to which the user terminal can access at its proximity.

12. The method of claim 10, wherein the terminal accessing allocator allocates to the user terminal an alternate IP address of the soft switch controlling device.

* * * * *